United States Patent
Reznik

(10) Patent No.: US 9,065,547 B2
(45) Date of Patent: *Jun. 23, 2015

(54) DIGITAL AUDIO SIGNAL COMPRESSION METHOD AND APPARATUS

(75) Inventor: Yuriy A. Reznik, Seattle, WA (US)

(73) Assignee: Intel Corporation, Santa Clara, CA (US)

(*) Notice: Subject to any disclaimer, the term of this patent is extended or adjusted under 35 U.S.C. 154(b) by 118 days.

This patent is subject to a terminal disclaimer.

(21) Appl. No.: 13/433,172

(22) Filed: Mar. 28, 2012

(65) Prior Publication Data

US 2012/0185258 A1    Jul. 19, 2012

Related U.S. Application Data

(63) Continuation of application No. 12/786,358, filed on May 24, 2010, which is a continuation of application No. 10/988,807, filed on Nov. 15, 2004, now Pat. No. 7,742,926, and a continuation-in-part of application No. 10/826,469, filed on Apr. 16, 2004.

(60) Provisional application No. 60/587,731, filed on Jul. 13, 2004, provisional application No. 60/464,068, filed on Apr. 18, 2003.

(51) Int. Cl.
*G10L 19/00* (2013.01)
*H04B 1/66* (2006.01)
*G10L 19/04* (2013.01)
*G10L 19/022* (2013.01)

(52) U.S. Cl.
CPC .............. *H04B 1/662* (2013.01); *G10L 19/022* (2013.01); *G10L 19/04* (2013.01)

(58) Field of Classification Search
CPC ....... H04B 1/662; G10L 19/022; G10L 19/09
USPC .................................................. 704/500–504
See application file for complete search history.

(56) References Cited

U.S. PATENT DOCUMENTS

| | | |
|---|---|---|
| 3,694,813 A | 9/1972 | Mommens et al. |
| 4,811,396 A | 3/1989 | Yatsuzuka |
| 4,853,780 A | 8/1989 | Kojima et al. |
| 5,210,820 A | 5/1993 | Kenyon |
| 5,265,167 A | 11/1993 | Akamine et al. |

(Continued)

FOREIGN PATENT DOCUMENTS

| | | |
|---|---|---|
| WO | 2006017178 A2 | 2/2006 |
| WO | 2006017178 A3 | 4/2007 |

OTHER PUBLICATIONS

Robinson, "SHORTEN: Simple lossless and near☐lossless waveform compression", Cambridge University Engineering Department, Cambridge, UK, Dec. 1994.*

(Continued)

*Primary Examiner* — Jialong He
(74) *Attorney, Agent, or Firm* — Æon Law; Adam L. K. Philipp

(57) ABSTRACT

Compression of audio signal data is described herein. In various embodiments, the compression of each unit of the audio signal data includes the employment of a distribution substantially representative of a subblock of residual data of the unit of audio signal data, to reduce the amount of data having to be transmitted to transmit the unit of audio signal data to a recipient.

19 Claims, 3 Drawing Sheets

(56) References Cited

U.S. PATENT DOCUMENTS

| | | | |
|---|---|---|---|
| 5,561,688 | A | 10/1996 | Jones |
| 5,654,990 | A | 8/1997 | Jones |
| 5,673,206 | A | 9/1997 | Jones |
| 5,677,933 | A | 10/1997 | Tae |
| 5,884,269 | A * | 3/1999 | Cellier et al. ............... 704/501 |
| 5,909,467 | A | 6/1999 | Tae |
| 6,014,622 | A | 1/2000 | Su et al. |
| 6,028,541 | A | 2/2000 | Levine |
| 6,041,302 | A * | 3/2000 | Bruekers .................. 704/503 |
| 6,094,636 | A * | 7/2000 | Kim ....................... 704/500 |
| 6,118,392 | A | 9/2000 | Levine |
| 6,330,534 | B1 | 12/2001 | Yasunaga et al. |
| 6,424,939 | B1 | 7/2002 | Herre et al. |
| 6,664,913 | B1 | 12/2003 | Craven et al. |
| 6,675,148 | B2 * | 1/2004 | Hardwick ................ 704/500 |
| 6,678,652 | B2 | 1/2004 | Fuchigami et al. |
| 6,728,669 | B1 | 4/2004 | Benno |
| 7,068,850 | B2 | 6/2006 | Youn |
| 7,272,657 | B2 | 9/2007 | Allen et al. |
| 2002/0094535 | A1 | 7/2002 | Nadon et al. |
| 2002/0147584 | A1 * | 10/2002 | Hardwick ................ 704/229 |
| 2003/0156648 | A1 * | 8/2003 | Holcomb et al. ........ 375/240.18 |
| 2003/0171919 | A1 * | 9/2003 | Kim et al. .............. 704/229 |
| 2004/0044521 | A1 * | 3/2004 | Chen et al. ............. 704/200.1 |
| 2004/0208169 | A1 | 10/2004 | Reznik |

OTHER PUBLICATIONS

Mat Hans et al., "Lossless Compression of Digital Audio", IEEE Signal Processing Magazine, Jul. 2001.*

Final Office Action received for U.S. Appl. No. 10/826,469, mailed on Sep. 17, 2008, 26 pages.

Non-Final Office Action received for U.S. Appl. No. 10/826,469, mailed on May 16, 2008, 21 pages.

Response to Office Action filed for U.S. Appl. No. 10/826,469, mailed on Aug. 18, 2008, 16 pages.

Response to Office Action filed for U.S. Appl. No. 10/826,469, mailed on Nov. 17, 2008, 11 pages.

Non-Final Office Action received for U.S. Appl. No. 10/988,807, mailed on May 23, 2008, 17 pages.

Non-Final Office Action received for U.S. Appl. No. 10/988,807, mailed on Feb. 23, 2009, 18 pages.

Final Office Action received for U.S. Appl. No. 10/988,807, mailed on Oct. 14, 2008, 25 pages.

Notice of Allowance received for U.S. Appl. No. 10/988,807, mailed on Feb. 5, 2010, 8 pages.

Notice of Allowance received for U.S. Appl. No. 10/988,807, mailed on Aug. 28, 2009, 8 pages.

Response to Office Action filed for U.S. Appl. No. 10/988,807, mailed on May 26, 2009, 13 pages.

Response to Office Action filed for U.S. Appl. No. 10/988,807, mailed on Aug. 25, 2008, 15 pages.

Response to Office Action filed for U.S. Appl. No. 10/988,807, mailed on Dec. 15, 2008, 12 pages.

Non-Final Office Action received for U.S. Appl. No. 12/786,358, mailed on Apr. 20, 2011, 9 pages.

Final Office Action received for U.S. Appl. No. 12/786,358, mailed on Sep. 9, 2011, 7 pages.

Notice of Allowance received for U.S. Appl. No. 12/786,358, mailed on Jan. 17, 2012, 9 pages.

Response to Office Action received for U.S. Appl. No. 12/786,358, mailed on Aug. 15, 2011, 14 pages.

International Search Report and Written Opinion received for PCT Patent Application No. PCT/US2005/024271, mailed on Feb. 22, 2007, 4 pages.

International Preliminary Report on Patentability and Written Opinion Received for PCT Patent Application No. PCT/US2005/024271, mailed on Mar. 20, 2007, 4 pages.

Hasegawa-Hohnson, et al., "Speech Coding: Fundamentals and Applications", Wiley Encyclopedia of Telecommunications, Dec., 2002, 20 pages.

Liebchen, et al., "Mpeg-4 Audio Lossless Coding", Audio Engineering Society, Convention Paper, Presented at the 116th Convention, Berlin, Germany, May 8-11, 2004, 1 page.

Mit Media Laboratory, "Mpeg-4 Structured Audio", Feb. 23, 2014, 5 pages. Retrieved from: http://sound.media_mit.edu/mpeg4/sa-tech.html.

Sayood, K., "Introduction to Data Compression", Morgan Kaufmann Publishers, New York, 2000, 702 pages.

* cited by examiner

DIGITAL AUDIO SIGNAL COMPRESSION METHOD AND APPARATUS

RELATED REFERENCES

This application is a Continuation of U.S. patent application Ser. No. 12/786,358, filed May 24, 2010, titled "DIGITAL AUDIO SIGNAL COMPRESSION METHOD AND APPARATUS", and naming inventor Yuriy A. Reznik. Prior application Ser. No. 12/786,358 is a Continuation of U.S. patent application Ser. No. 10/988,807 (U.S. Pat. No. 7,742,926), filed Nov. 15, 2004, titled "DIGITAL AUDIO SIGNAL COMPRESSION METHOD AND APPARATUS," and naming inventor Yuriy A. Reznik. Prior application Ser. No. 10/988,807 is a Continuation-in-Part of U.S. patent application Ser. No. 10/826,469, filed Apr. 16, 2004, titled "DIGITAL AUDIO SIGNAL COMPRESSION METHOD AND APPARATUS", and naming inventor Yuriy A. Reznik. Prior application Ser. No. 10/826,469 claims the benefit of priority to Provisional Application No. 60/464,068, filed Apr. 18, 2003, and titled "NOISELESS COMPRESSION OF PCM AUDIO SIGNALS."

Prior application Ser. No. 10/988,807 also claims the benefit of priority to Provisional Application No. 60/587,731, filed Jul. 13, 2004, entitled "Digital Audio Signal Compression Method and Apparatus." The above-cited applications are incorporated by reference in their entireties as if fully set forth herein and for all purposes.

FIELD

The present invention relates to the field of signal processing. More specifically, the present invention relates to compression of audio signal data.

BACKGROUND

Digital audio has a number of advantages over analog audio. In particular, pulse code modulation (PCM) audio has a number of advantages over other audio formats. For example, digital audio, in particular, PCM audio, offers freedom to interchange audio data without generation loss between media. Increasingly, PCM audio is not only being offered from medium like compact disc (CD), it is also widely employed in broadcast programming, through air waves or cable, or in streamed contents, through private and/or public networks, such as the Internet.

For broadcast programming or streamed contents, bandwidth availability/consumption remains a significant challenge.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Figure 1:
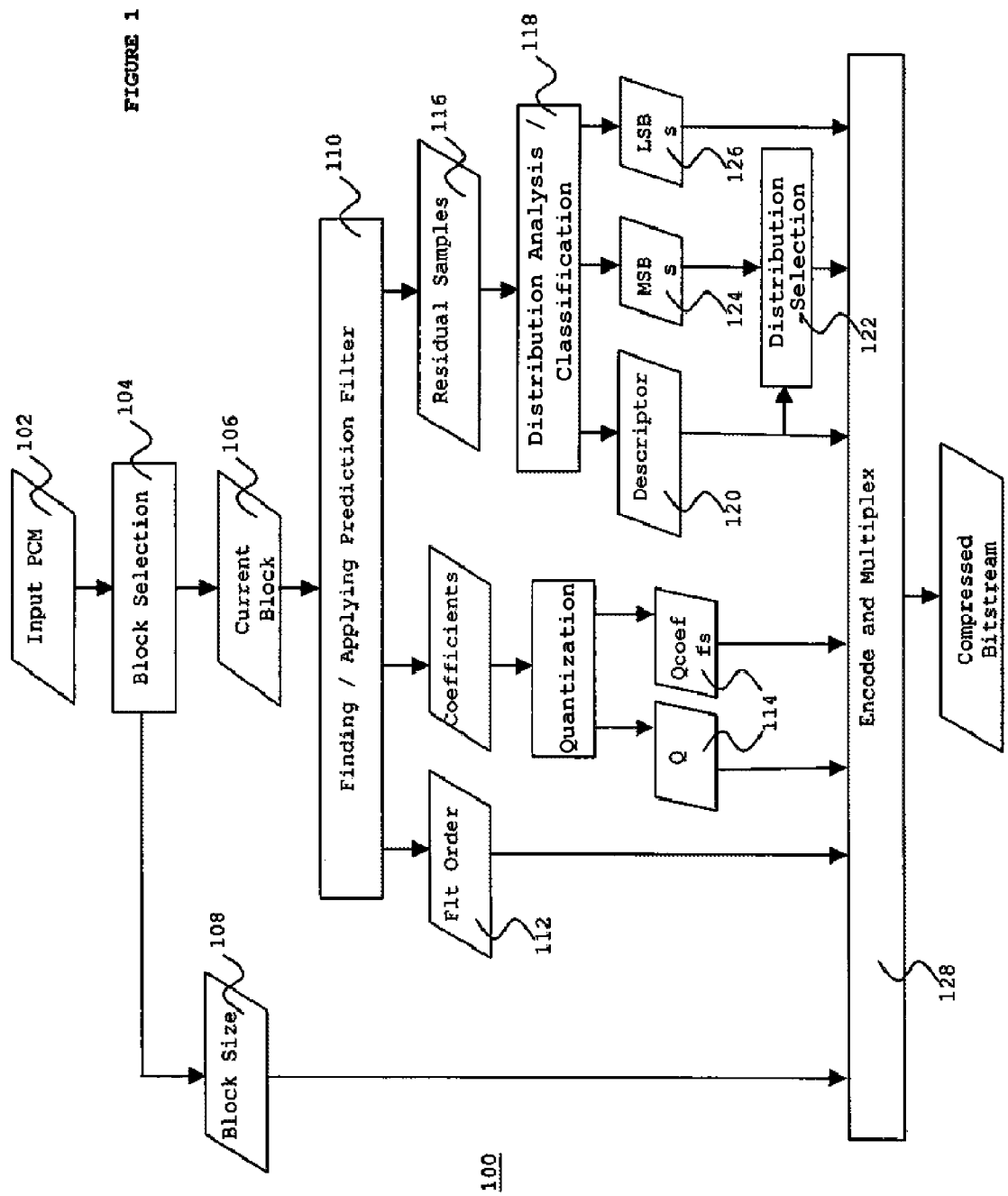
FIG. 1 illustrates a method view for compressing audio signal data, in accordance with some embodiments of the present invention.

Illustrative embodiments of the present invention include, but are not limited to, method to compress digital audio data (in particular, PCM audio data), encoders/decoders adapted to practice all or portions of the method, and systems having the encoders/decoders.

In the description to follow, for ease of understanding, the present invention will primarily be described in the context of PCM audio embodiments, however, the present invention may be practiced for other digital audio, e.g. one-bit oversampled audio representations commonly used in super-audio compact disks (SACD).

Various aspects of embodiments of the present invention will be described. However, various embodiments may be practiced with only some or all of the described aspects. For purposes of explanation, specific numbers, materials and configurations are set forth in order to provide a thorough understanding of the embodiments being described. In alternate embodiments, they may be practiced without the specific details. In various instances, well-known features are omitted or simplified in order not to obscure the essence of the embodiments.

Parts of the description will be presented in signal processing terms, such as data, filtering, quantization, encoding, decoding, and so forth, consistent with the manner commonly employed by those skilled in the art to convey the substance of their work to others skilled in the art. As well understood by those skilled in the art, the data quantities take the form of electrical, magnetic, or optical signals capable of being stored, transferred, combined, and otherwise manipulated through mechanical, electrical and/or optical components of a general/special purpose computing device/system.

The term "computing device/system" as used herein includes general purpose as well as special purpose data processing machines, systems, and the like, that are standalone, adjunct or embedded. Examples of general purpose "computing devices/systems" include, but are not limited to, handheld computing devices (palm sized, tablet sized and so forth), laptop computing devices, desktop computing devices, servers, and so forth. Examples of special purpose "computing device/system" include, but are not limited to, processor based wireless mobile phones, handheld digital music players, set-top boxes, game boxes/consoles, CD/DVD players, digital cameras, digital CAMCORDERs, and so forth. [DVD—Digital Versatile Disk]

Various operations will be described as multiple discrete operations in turn, in a manner that is most helpful in understanding the various embodiments of the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising", "having" and "including" are synonymous, unless the context dictates otherwise.

Referring now to FIG. 1, wherein a method view of the present invention, in accordance with some embodiments, is illustrated. As illustrated, for the embodiments, the process 100 starts with the receiving 102 of a portion of a stream of audio signal data (e.g. PCM audio signal data). On receipt, or shortly thereafter, the audio signal data is partitioned 104 into a number of data blocks for subsequent processing (compression). In various embodiments, the audio signal data is partitioned 104 into a number of fixed or variable size data blocks, and when variable sized-blocks are used, the variable data block sizes are conveyed 108 to the recipient (e.g. multiplexed 128 onto the transmission bit stream). For the embodiments, the default fixed data block size is assumed to be known to the recipient, however, in other embodiments, the invention may nonetheless be practiced including the conveyance of the fixed data block size to the recipient (e.g. multiplexed 128 onto the transmission bit stream).

For the embodiments, the data blocks are selected 106 one block at a time, and the remaining operations of process 100 are applied to the currently selected data block to process and compress the data block, and ultimately, after compression, placing 128 the processed/compressed data onto the transmission bit stream for transmission to a recipient. The operations are repeated until all data blocks of the received portion of the audio signal have been processed (compressed), and multiplexed 128 onto the transmission bit stream.

In alternate embodiments, each data block may be further partitioned into sub-blocks, with the sub-blocks being selected for processing (compression) and multiplexed 128 onto the transmission bit stream, one sub-block at a time. Likewise, for these embodiments, the sub-block size may be fixed or variable. Regardless, the sub-block size is conveyed to a recipient. For these embodiments, the operations are also repeated until all sub-blocks of the data block have been processed (compressed) and multiplexed 128 onto the transmission bit stream. Then, the operations are repeated again until all data blocks of the received portion of the audio signal have been processed (compressed) and multiplexed 128 onto the transmission bit stream.

Continuing to refer to FIG. 1, on selection, a prediction filter is applied 110 to the unit (block or sub-block) of audio data to be processed and compressed. Similar to the block/sub-block size information, the parameters of the prediction filter are conveyed 112-114 to the recipient (e.g. multiplexed 128 onto the transmission bit stream).

In various embodiments, the filtering may be assisted by the employment of neighboring blocks. In various embodiments, the prediction filter is a Linear Prediction Filter, and the parameters are the prediction order p, and the prediction coefficients $a_1, \ldots a_p$. In various embodiments, the parameters conveyed 112-114 to the recipient may include the prediction order p, the quantization step size use to quantize prediction coefficients, and the quantized prediction coefficients $\hat{a}_1, \ldots, \hat{a}_p$.

As illustrated, for the embodiments, as a result of the application of the prediction filter to the unit of audio data, residual samples $e_1, \ldots e_n$ are generated 116. Next, a number of statistical measures are determined for the residual samples to characterize 118 their distribution (to be described more fully below). For the embodiment, the statistical measures are employed to form 120 a distribution descriptor (also to be described more fully below), which in turn is conveyed to the recipient (e.g. multiplexed onto the transmission bit stream). Further, for the embodiment, the statistical measures are employed to select 122 a distribution known to the recipient, and an identifier of the selected distribution is conveyed to the recipient (e.g. multiplexed 128 onto the transmission bit stream). In various embodiments, the distribution descriptor also serves as the identifier of the selected distribution. In particular, it is used as an index into an array of known distribution stored at the recipient.

In various embodiments, the statistical measures determined include a mean value of the residual samples, their variances, the skewness of their distribution, and the kurtosis of their distribution. In other embodiments, the invention may be practiced with more or less statistical measures.

Still referring to FIG. 1, for the embodiment, the determined statistical measures are also employed to divide each residual sample into two portions, a most significant bits (MSB) portion, and a least significant bit (LSB) portion (to be described more fully below). For the embodiments, the LSB of each residual sample is directly transmitted to the recipient (e.g., multiplexed 128 onto the transmission bit stream without encoding). For the embodiments, the number of LSB of each residual sample being directly transmitted to the recipient is also conveyed to the recipient (e.g., multiplexed 128 onto the transmission bit stream without encoding).

In various embodiments, the mean DC offset, if applicable, is also computed, and conveyed to the recipient (e.g., multiplexed 128 onto the transmission bit stream without encoding). For these embodiments, DC offset is subtracted from the residual samples.

Further, the MSBs of each residual sample are encoded 122-124 using codewords (or simply, codes) constructed using the selected distribution. The encoded MSBs are then provided to the recipient (e.g., multiplexed 128 onto the transmission bit stream without encoding). In various embodiments, the constructed codes may be Huffman codes, run length codes, adaptive arithmetic codes, non-adaptive arithmetic codes (e.g. Gilbert-Moore codes), or other codes of the like.

In the foregoing description, the conveyance to the recipient (e.g., multiplexed 128 onto the transmission bit stream) of the various values, block sizes, prediction order, quantization sizes, quantized prediction coefficients, distribution identifier, distribution descriptor, the number of LSB of each residual sample to be conveyed, the LSB, the encoded MSB, and so forth, are immediately described following the description of their generations. The order of presentation is merely for ease of understanding. The order of these descriptions is not to be read as limiting on the invention, requiring their conveyance on generation. The generated values may be stored, and processed into a transmission bit stream in batch. Further, multiple transmission bit stream, and/or multiple channels (of like or different kinds) may be employed for the transmission.

Referring now to the statistical measure determination 118, the LSB identification 126, and the MSB encoding 124 operations again, an embodiment of these operations will be described in further detail. Recall the received audio data are first partitioned 104 in to blocks or sub-blocks, and the blocks/sub-blocks are selected for processing, one block/sub-block at time. Assume the selected unit (block/sub-block) has a size of n, and the residual samples of this unit are $e_1 \ldots e_n$.

For the earlier described embodiment, where four statistical measures, the mean value of the residual sample, their variances, the skewness of the their distribution, and the kurtosis of their distribution, are computed, the computations are performed in accordance with the following formulas:

mean value of the residuals:

$$\bar{e} = \frac{1}{n}\sum_{i=1}^{n} x_i;$$

standard deviation of the residual's distribution: $\sigma=\sqrt{\text{var}\,e}$, where $$\text{var}\,e = \frac{1}{n-1}\sum_{i=1}^{n}(e_i - \bar{e})^2;$$

skeweness of the distribution:

$$\text{skew}\,e = \frac{1}{n}\sum_{i=1}^{n}\left[\frac{e_i - \bar{e}}{\sigma}\right]^3;$$

and
kurtosis of the distribution:

$$\text{kurt}\,e = \frac{1}{n}\sum_{i=1}^{n}\left[\frac{e_i - \bar{e}}{\sigma}\right]^4 - 3.$$

Further, the distribution descriptor is formed as follows (with the quantized versions) of these quantities:

$$dsc = dsc(\bar{e}, \log_2\sigma, \text{skew}\,e, \text{kurt}\,e).$$

In alternate embodiments, e.g. embodiments offering low-complexity modes, kurt e=0; skew e=0; $\bar{e}$=0 instead of calculating them properly.

Further, in various alternate embodiments, parameter $\sigma$ may be estimated by using absolute deviation or absolute mean of the residual:

$$\sigma' = C_1 \frac{1}{n}\sum_{i=1}^{n}|e_i - \bar{e}| \text{ or,} \quad (a)$$

$$\sigma'' = C_1 \frac{1}{n}\sum_{i=1}^{n}|e_i| \text{ (under assumption that } \bar{e} \to 0), \quad (b)$$

where $C_1$ is a constant chosen in view of the distribution (e.g. for zero mean Laplacian distribution, $C_1$ may be set to 1/sqrt(2)).

Further, in various embodiments, the distribution descriptor may be formed using
(i) only variance estimate (e.g. when mean=0) (optionally, using e.g. the (b) variance estimate approach described above),
(ii) variance+mean estimates (optionally, using e.g. the (c) variance estimate approach described above).

In various embodiments, on determination of the statistical measures, and selection of the distribution, an inverse-quantized mean value $\langle \bar{e} \rangle$, and the logarithm of standard deviation $\log_2 \sigma$ of the distribution $\langle \log_2 \sigma \rangle$ are reconstructed.

Then, the reconstructed values are employed to split each residual sample into MSB and LSB as follows:

$$e_i^{MSB} = (e_i - \langle \bar{e} \rangle) >> \max(\langle \log_2\sigma \rangle - C_2, 0);$$

$$e_i^{LSB} = (e_i - \langle \bar{e} \rangle) \& ((1 << \max(\langle \log_2\sigma \rangle - C_2, 0)) - 1);$$

where $C_2$ is an empirically selected constant. In various embodiments, $C_2$ is set to equal 3.

During decoding, each residual sample will be recombined as follows:

$$e_i = e_i^{MSB} << \max(\langle \log_2\sigma \rangle - C_2, 0)) + e_i^{LSB} + \langle \bar{e} \rangle.$$

where $C_2$ is an empirically selected constant. In various embodiments, $C_2$ is set to equal 3.

In various embodiments, the distribution descriptor is also the identifier of the selected distribution, as it indexes into an array of pre-stored distributions of the MSBs of the residual samples, at both the sender and the recipient.

In various embodiments, the ranges of MSBs in these pre-stored distributions are restricted to [−21,21], which approximately corresponds to the range of [−3σ,3σ] in the non-normalized distribution.

As described earlier, the selected distribution is used to construct block codes for encoding of the MSBs of the residual samples. Their LSBs will be transmitted directly using $\max(\langle \log_2 \sigma \rangle\ C_2, 0)$ bits for each residual sample. To encode samples which MSBs fall outside the $[-\bar{e}\{MSB\}_{max}, \bar{e}\{MSB\}_{max}]$ range, for the embodiment, the encoder transmits an escape code ($\bar{e}\{MSB\}_{max}+1$), and then uses any standard monotonic code (e.g. Golomb codes, Golomb-Rice codes, Levenstein code, etc.) to transmit the difference $|e_i^{MSB}|$ and the escape code.

Figure 3:
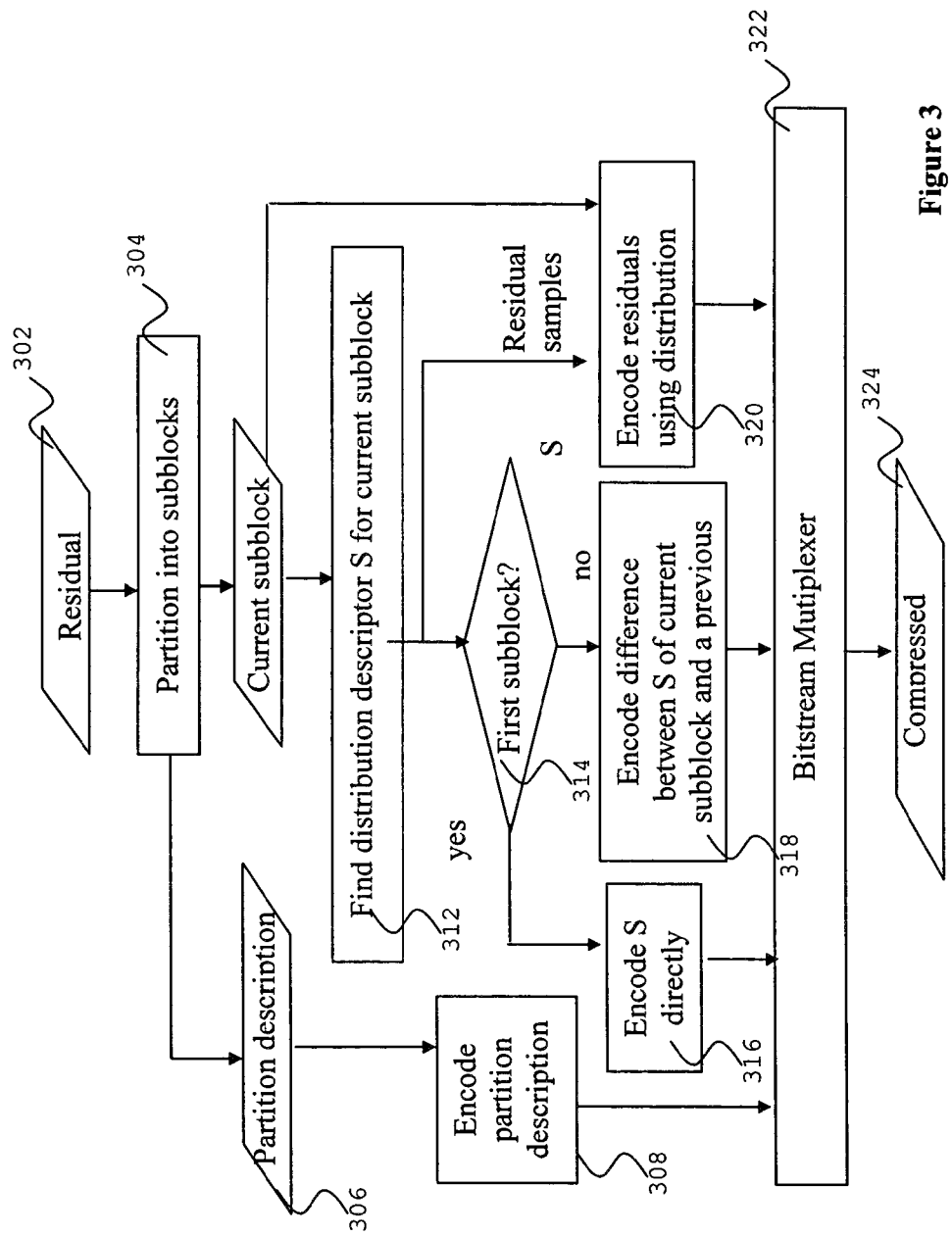
FIG. 3 illustrates a method view for compressing the residual samples in accordance with some embodiments of the present invention.

Referring now to FIG. 3, wherein a method view illustrating a method for compressing the residual signal in accordance with some embodiments is shown. The method may be practiced in conjunction with the method of FIG. 1 or with other audio/video signal/data compression techniques As illustrated, at block 304, a block of residual samples 302 is partitioned into smaller subblocks. Next, a description of the partition is formed, block 306, and the description of such a partition is transmitted as a side information, or encoded 308 and multiplexed 322 into bitstream 324. In various embodiments, the description of the partition is given for the number of sub-blocks, all of which may be equally sized. In other embodiments, the description of the partition is given in the form of a binary-tree-type description, where the total size of the block (which may be equal to a power of 2) and smallest acceptable size of the sub-block are specified.

Additionally, for each sub-block, the descriptor of the distribution of residual data is calculated, block 312. In a most general case, such descriptor may be a continuous function of a sufficient statistic of the distribution. In various embodiments, it may be a continuous function of the sample variance of the distribution, e.g. a logarithm of the sample variance of the distribution. In other embodiments, it may be a continuous function of a sample absolute mean of the distribution, e.g. a logarithm of the sample absolute mean of the distribution. In various embodiments, each of these statistics may be computed as earlier described.

In various embodiments, distribution descriptors for sub-blocks are encoded differently based on whether the encoding is dealing with the first subblock in the bitstream (or random-access-enables segment of the bistream) or it is a subsequent one, blocks 314, 316, and 318. In a case of first subblock 314, its distribution descriptor may be encoded as is, without any contexts of prediction information, block 316. In a case of the subsequent subblocks 314, their descriptors may be coded predictively, using prior subblocks, block 318. In various embodiments, such prediction may be implemented as a difference between current descriptor and the one corresponding to the prior subblock. In alternate embodiments, the Golomb-Rice codes are used to encode such differences between descriptors.

Further, the residual samples in each subblock are encoded using specifically selected distributions, provided by their corresponding distribution descriptors, block 320. In various embodiments, the encoding is performed using one or more known coding techniques, such as Huffman codes (in specific case, Golomb-Rice codes), Gilbert-Moore (arithmetic) codes, Fixed-lengths codes, and combinations thereof.

As with the encoded partition descriptors, the encoded components are multiplexed into the continuous bitstream and transmitted, blocks 322-324.

Figure 2:
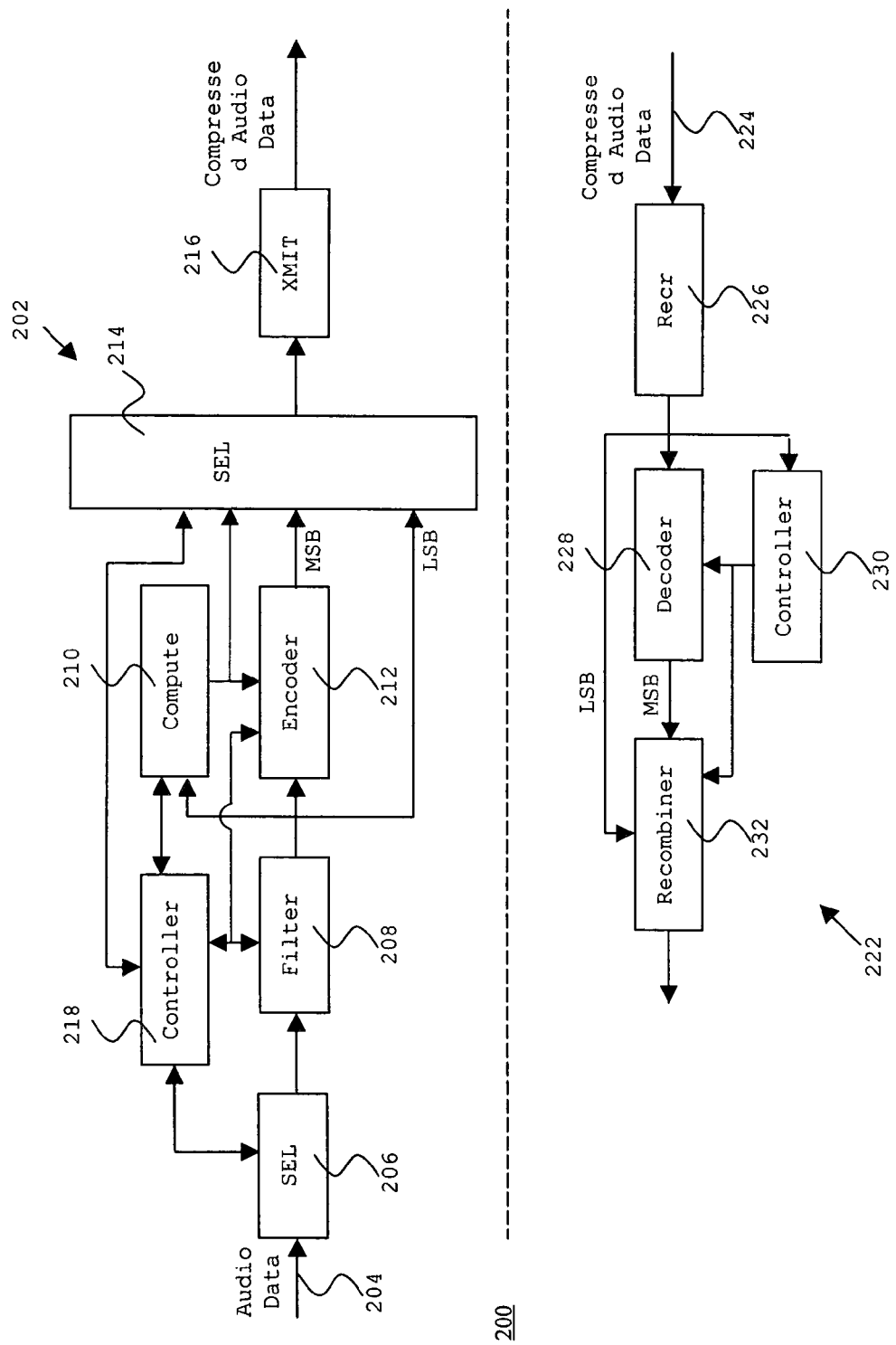
FIG. 2 illustrates a system, including its transmit and receive sections, in accordance with some embodiments.

Referring now to FIG. 2, wherein a system having a transmit section and a receive section, both adapted to practice the compression methods of FIG. 1 and/or FIG. 3, in accordance with some embodiments, is shown. In alternate embodiments, a system may comprise only the transmit section or the receive section. It is not necessary to always practice the invention with both sections.

As illustrated, for the embodiments, system 200 comprise transmit section 202 including transmitter 216, and a receive section 222 including receiver 226. In alternate embodiments, transmit and receive sections may share a common transceiver. Further, for the embodiments, in addition to transmitter 216, transmit section 202 includes controller 218, whereas in addition to receiver 226, receive section 222 includes controller 230, to control the operations of the various elements of the respective sections. Similarly, in alternate embodiments, transmit and receive sections may share a common controller instead.

For the embodiment, in addition to transmitter 216 and controller 218, transmit section 202 further includes first selector 206, filter 208, encoder 212, computer unit 210, and second selector 214, coupled to each other, and to transmitter 216 and controller 218 as shown. Selector 206 is employed, under the control of controller 218 to partition a portion of a stream of audio signal data into blocks or sub-blocks. Filter 208 is a prediction filter, to be applied, under the control of controller 218, to the current of audio signal data to be processed and compressed. Compute unit 210 under the control of controller 218 is employed to perform the various earlier described computations. Encoder 212 is employed under the control of controller 218 to encode the MSB of the residual samples as earlier described. Second selector 214 under the control of controller 218 is employed to select the various output values to be outputted, and multiplexed them onto the transmission bit stream.

For the embodiment, in addition to receiver 226 and controller 230, receive section 222 further includes decoder 228, and recombiner 232, coupled to each other, and to receiver 226 and controller 230 as shown. Decoder 228, under the control of controller 230, is employed to decode the encoded MSB of the residual samples as earlier described. Recombiner 232 is employed, under the control of controller 230, to recombine the received MSB and LSB to reconstitute the residual sample.

In various embodiments, encoder 212 is also adapted to practice the method illustrated by FIG. 3, i.e. partitioning the residual data of an unit of audio signal data into subblocks, determining the distributions of the subblocks, and encoding the subblocks based at least in part on the determined distributions to reduce the amount of data having to be transmitted by transmitter 216.

Except for the logic provided to these elements and/or their usage to cooperate with other elements to effectuate the desired compression of audio signal, these elements otherwise may be implemented in a variety of manners, in hardware, firmware, software, or combination thereof. Thus, system 200 represents a broad of range of systems having audio transmission and/or audio reception capabilities. For examples, system 200 may be a wireless mobile phone, a palm-sized computer, a tablet computer, a laptop computer, a desktop computer, a server, a set-top box, an audio/video entertainment unit, a music player, a DVD player, a CD player, a CAMCORDER, and so forth.

Thus, a novel audio signal data compression method and apparatus has been described. Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

The invention claimed is:

1. A computer-implemented audio bit stream decoding method comprising:

processing by the computer a bit stream received from a transmission device, said bit stream representing in substance a unit of audio signal data, said bit stream comprising a plurality of encoded subblocks of residual data, said subblocks having been partitioned from a block of said residual data, said block of said residual data having been generated from applying a prediction filter to the unit of audio signal data, said subblocks of residual data having been encoded utilizing a plurality of statistical measures characterizing a distribution of said subblocks of residual data to assist in reducing an amount of data having to be included in said bit stream, said plurality of statistical measures including at least two of: a mean of said subblock of residual data, a variance of said subblock of residual data, an estimate of said variance, a skewness of said distribution, and a kurtosis of said distribution;

for each of said plurality of encoded subblocks, determining according to said bit stream, said plurality of statistical measures characterizing said distribution of said subblock of residual data; and for each of said plurality of encoded subblocks, reconstructing said subblock of residual data according to said encoded subblock of residual data and said determined plurality of statistical measures characterizing said distribution of said subblock of residual data.

2. The method of claim 1, wherein said bit stream further comprises a description of the partitioning in a selected one of an un-encoded and encoded form.

3. A non-transient computer-readable storage medium having stored thereon instructions that, when executed by a processor, configure the processor to perform the method according to claim 1.

4. A computing apparatus for decoding an audio bit stream, the apparatus comprising a processor and a memory storing instructions that, when executed by the processor, configure the apparatus to perform the method according to claim 1.

5. A computer-implemented audio bit stream decoding method comprising:

at a first computer, receive a bit stream comprising an encoded subblock of residual data partitioned from a block of residual data, said block of said residual data having been generated by application of a prediction filter to a unit of audio signal data, said subblock of said residual data having been encoded utilizing a plurality of statistical measures comprising at least two of: a mean of said subblock of residual data, a variance of said subblock of residual data, an estimate of said variance, a skewness, and a kurtosis;

determine, by the computer according to said bit stream, said plurality of statistical measures; and reconstruct said subblock of residual data, by the computer, according to said encoded subblock of residual data and said determined plurality of statistical measures.

6. The method of claim 5, wherein determine said plurality of statistical measures comprises receive an encoded distribution descriptor which describes the statistical measures.

7. The method of claim 6, further comprising decode the encoded distribution descriptor if said subblock is a first subblock of residual data.

8. The method of claim 6, further comprising decode an encoded difference between said distribution descriptor and a distribution descriptor of a prior subblock of the residual data if said subblock is not a first subblock of residual data.

9. The method of claim 8, wherein decode the encoded distribution descriptor comprises process a Golomb-Rice code included in said bit stream.

10. The method of claim 5, wherein reconstruct said subblock of residual data comprises process a selected one of Huffman codes and run-length codes, included in said bit stream, based at least in part on said statistical measures.

11. A non-transient computer-readable storage medium having stored thereon instructions that, when executed by a processor, configure the processor to perform the method according to claim 5.

12. A computing apparatus for decoding an audio bit stream, the apparatus comprising a processor and a memory storing instructions that, when executed by the processor, configure the apparatus to perform the method according to claim 5.

13. A computer-implemented method for decoding an audio bit stream representing a unit of audio signal data, the method comprising:

receive a bit stream comprising an encoded subblock of residual data partitioned from a block of said residual data, said block of said residual data having been generated from application of a prediction filter to the unit of audio signal data, said subblock of residual data having been encoded utilizing a plurality of statistical measures characterizing a distribution of said subblock of residual data, said plurality of statistical measures including at least two of: a mean of said subblock of residual data, a variance of said subblock of residual data, an estimate of said variance, a skewness of said distribution, and a kurtosis of said distribution;

determine, according to said bit stream, said plurality of statistical measures characterizing said distribution of said subblock of residual data; and reconstruct said subblock of residual data according to said encoded subblock of residual data and said determined plurality of statistical measures characterizing said distribution of said subblock of residual data.

14. The decoder of claim 13, wherein determine said plurality of statistical measures comprises process a distribution descriptor included in said bit stream and associated with said encoded subblock of residual data, said distribution descriptor based at least in part on said plurality of statistical measures characterizing said distribution of said subblock of residual data.

15. The decoder of claim 14, wherein determine said plurality of statistical measures comprises decode an encoded distribution descriptor if said subblock is a first subblock of residual data included in said bit stream.

16. The decoder of claim 14, wherein determine said plurality of statistical measures comprises determine a difference or differences between said distribution descriptor and a distribution descriptor of a prior subblock of said residual data if said subblock is not a first subblock of residual data included in said bit stream.

17. The decoder of claim 16, further comprising use a Golomb-Rice code to determine the difference or differences between said distribution descriptor and the distribution descriptor of a prior subblock of said residual data.

18. A non-transient computer-readable storage medium having stored thereon instructions that, when executed by a processor, configure the processor to perform the method according to claim 13.

19. A computing apparatus for decoding an audio bit stream, the apparatus comprising a processor and a memory storing instructions that, when executed by the processor, configure the apparatus to perform the method according to claim 13.

* * * * *